(12) United States Patent
Daeffler et al.

(10) Patent No.: US 11,549,066 B1
(45) Date of Patent: Jan. 10, 2023

(54) CITRATE POLYESTER ADDITIVES FOR CRUDE OIL, MIXTURES OF SAID ADDITIVES AND CRUDE OIL, AND METHODS FOR PRODUCING SAID MIXTURES

(71) Applicant: Cameron International Corporation, Houston, TX (US)

(72) Inventors: Christopher S. Daeffler, Sugar Land, TX (US); Graham Robert Drummond, Aberdeen (GB); Grady F. Parker, III, Houston, TX (US); Hema Rampersad, Katy, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/444,758

(22) Filed: Aug. 10, 2021

(51) Int. Cl.
| | |
|---|---|
| *C10G 29/20* | (2006.01) |
| *C09K 8/524* | (2006.01) |
| *C09K 8/035* | (2006.01) |
| *C08G 63/06* | (2006.01) |

(52) U.S. Cl.
CPC ............ *C10G 29/20* (2013.01); *C08G 63/06* (2013.01); *C09K 8/035* (2013.01); *C09K 8/524* (2013.01); *C10G 2300/1033* (2013.01); *C10G 2300/201* (2013.01); *C10G 2300/304* (2013.01); *C10G 2300/4037* (2013.01); *C10G 2300/44* (2013.01)

(58) Field of Classification Search
CPC ............ C10G 29/20; C10G 2300/1033; C10G 2300/201; C10G 2300/304; C08G 63/06; C09K 8/035; C09K 8/524
See application file for complete search history.

(56) References Cited

U.S. PATENT DOCUMENTS

| | | | | |
|---|---|---|---|---|
| 4,868,236 A | * | 9/1989 | O'Lenick, Jr. .......... | C08L 69/00 560/182 |
| 7,700,076 B2 | | 4/2010 | Tamarkin et al. | |
| 7,820,145 B2 | | 10/2010 | Tamarkin et al. | |
| 8,148,569 B1 | * | 4/2012 | O'Lenick .............. | C07C 69/704 424/401 |
| 8,158,114 B1 | * | 4/2012 | O'Lenick .............. | C08G 63/50 424/401 |
| 8,182,796 B1 | * | 5/2012 | O'Lenick .............. | A61Q 17/04 424/401 |
| 8,192,726 B1 | * | 6/2012 | O'Lenick .............. | A61K 8/375 424/401 |
| 8,435,498 B2 | | 5/2013 | Tamarkin et al. | |
| 8,623,342 B1 | * | 1/2014 | O'Lenick .............. | C08G 63/60 424/70.11 |
| 8,709,385 B2 | | 4/2014 | Tamarkin et al. | |
| 8,741,265 B2 | | 6/2014 | Tamarkin et al. | |
| 8,747,822 B1 | * | 6/2014 | O'Lenick .............. | A61Q 5/12 424/70.11 |
| 8,821,842 B2 | | 9/2014 | Lange et al. | |
| 9,023,863 B2 | | 5/2015 | Abram et al. | |
| 9,439,857 B2 | | 9/2016 | Tamarkin et al. | |
| 9,492,412 B2 | | 11/2016 | Tamarkin et al. | |
| 9,732,071 B2 | | 8/2017 | Patron et al. | |
| 9,827,195 B2 | | 11/2017 | Abram et al. | |
| 10,392,371 B2 | | 8/2019 | Patron et al. | |
| 10,780,032 B1 | | 9/2020 | Rajaiah et al. | |
| 2010/0105580 A1 | * | 4/2010 | Becker .................. | C09K 8/54 507/224 |
| 2013/0150272 A1 | | 6/2013 | Sonne | |
| 2016/0186045 A1 | * | 6/2016 | Maguire-Boyle ........ | C09K 8/68 507/216 |
| 2017/0327734 A1 | * | 11/2017 | Zhou .................. | C09K 8/887 |
| 2018/0086862 A1 | | 3/2018 | Kundu et al. | |
| 2018/0371353 A1 | | 12/2018 | Herzog | |

FOREIGN PATENT DOCUMENTS

| | | |
|---|---|---|
| CN | 103184043 A | 7/2013 |
| CN | 107057669 A | 8/2017 |
| WO | 2014127924 A1 | 8/2014 |

OTHER PUBLICATIONS

International Search Report and Written Opinion issued in the PCT Application PCT/US2022/039718, dated Nov. 23, 2022 (10 pages).

* cited by examiner

*Primary Examiner* — Ellen M McAvoy
(74) *Attorney, Agent, or Firm* — Helene Raybaud

(57) ABSTRACT

Citrate polyester additives for crude oils, mixtures of the citrate polyester additives and crude oils, and methods for producing or forming the mixtures are provided. The mixtures and methods comprise at least one citrate polyester additive introduce or applied to crude oil, wherein the at least one citrate polyester additive comprises one or more citrate crosspolymers.

20 Claims, No Drawings

CITRATE POLYESTER ADDITIVES FOR CRUDE OIL, MIXTURES OF SAID ADDITIVES AND CRUDE OIL, AND METHODS FOR PRODUCING SAID MIXTURES

FIELD OF THE DISCLOSURE

The present disclosure is generally directed to citrate polyester additives for crude oils, mixtures of the citrate polyester additives and crude oils, and methods for producing, forming, or providing the mixtures. The citrate polyester additives are added to, mixed with, or applied to the crude oils to produce, form, or provide crude oil mixtures. The methods for producing the crude oil mixtures may comprise applying the citrate polyester additives to the crude oils either in a subterranean flow path, at a surface facility, and/or at a subsea facility.

BACKGROUND

Wax crystal formation in crude oils is common during well operation, as the crude oils cool from bottomhole static temperatures to mudline or surface conditions. Overtime, the wax crystals can coat the interior of wellbore equipment, leading to higher pressure drops and lower production rates. Often, the wax crystal formation leads to gelation and formation of gelled oils. The high viscosities of the gelled oils create challenges during the storage and transport of crude oil produced from a well or wellbore, as heating would be required to achieve enough flowability to move the oil between containers.

Traditionally, at least one paraffin inhibitor (hereinafter "PI") and/or at least one pour point depressant (hereinafter "PPD") is often applied to a crude oil to affect and/or reduce wax crystal formation, deposition and gelling in the crude oil. During production, the PI is often introduced to the crude oil to slow a rate of wax deposition in the crude oil and/or the PPD is introduced to the crude oil so that the crude oil is flowable at anticipated surface conditions. The PI and/or the PPD is sometimes applied to the crude oil downhole to reduce the rate of wax deposition in the crude oil and/or improve flowability of the crude oil, respectively. Molecular structures of the PI and/or the PPD are typically designed to co-crystallize or adsorb to wax during crystallization and alter the crystal morphology so the crystals do not adhere to the casing or tubing surfaces and/or a weaker gel network are formed, respectively. However, each crude oil is a unique, complex mixture of components that can be saturated or unsaturated, polar or non-polar, and charged or neutral. Often, the PI also functions as a weak PPD as a side effect which may further improve flowability of the crude oil at the anticipated surface conditions.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, a crude oil mixture may comprise crude oil and at least one citrate polyester additive comprising one or more citrate crosspolymers.

In some embodiments, the one or more citrate crosspolymers may be according to the general structure

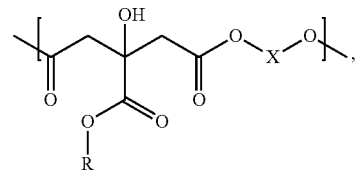

wherein R is an alkyl group and X is methylene chain.

In some embodiments, the ratio of R:X present in the general structure disclosed herein may be about 1:1, greater than about 1:1, or less than about 1:1.

In some embodiments, the at least one citrate polyester additive may comprise a reaction mixture of citrate crosspolymers having the same polymer structures or different polymer structures.

In some embodiments, the at least one citrate polyester additive may comprise linear polymers and/or non-linear or branched polymers.

In some embodiments, the polymers of the at least one citrate polyester additive may same or different connectivity with the O—X—O linker of the general structure disclosed herein.

In an embodiment, at least one citrate polyester additive may comprise a citrate crosspolymer solution comprising one or more citrate crosspolymers dissolved or suspended in a solvent of the citrate crosspolymer solution.

In an embodiment, the citrate crosspolymer solution may be present in the crude oil mixture at a concentration ranging from about 50 ppm to about 10,000 ppm.

In an embodiment, the solvent may be at least one aromatic solvent having an aromatic content of about 98% or higher.

In an embodiment, the one or more citrate crosspolymers may comprise at least one side chain selection from at least one octyldodecyl side chain, at least one stearyl side chain, at least one behenyl side chain, and a mixture thereof.

In an embodiment, the one or more citrate crosspolymers may be selected from an octyldodecyl citrate crosspolymer, a stearyl/octyldodecyl citrate crosspolymer, a behenyl/octyldodecyl propanediol citrate crosspolymer, and a mixture thereof.

In an embodiment, at least one citrate polyester additive may further comprise at least one selected from poly(ethylene-co-vinyl acetate), one or more graft polymers of poly(ethylene-co-vinyl acetate), functionalized poly(olefin-co-maleic anhydride), poly(alkylacrylate), functionalized poly(styrene-co-maleic anhydride), poly(alkylmethacrylates), one or more alkyl fumarate copolymers, one or more methacrylic/acrylic copolymers, one or more vinyl acetate olefin copolymers, one or more alkyl phenol resin copolymers, one or more hyperbranched or dendrimeric copolymers, and a mixture thereof.

In embodiments, a crude oil mixture may comprise crude oil and a citrate crosspolymer solution comprising one or more citrate crosspolymers dissolved or suspended within a solvent of the citrate crosspolymer solution.

In an embodiment, the one or more citrate crosspolymers may be according to the general structure

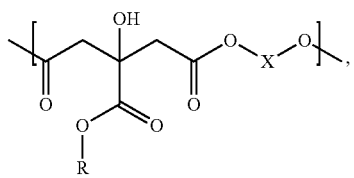

Wherein R is an alkyl group and X is methylene chain.

In an embodiment, the citrate crosspolymer solution may be present in the crude oil mixture at a concentration ranging from about 750 ppm to about 3,500 ppm.

In an embodiment, the concentration of the citrate crosspolymer solution ranges from about 1,000 ppm to about 2,000 ppm.

In embodiments, a method may comprise applying a citrate polyester additive to a crude oil, wherein the citrate polyester additive comprises one or more citrate crosspolymers according to the general structure

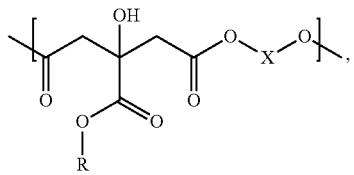

wherein R is an alkyl group and X is methylene chain.

In an embodiment, the citrate polyester additive may be a wellbore fluid comprising the one or more citrate crosspolymers.

In an embodiment, the method may further comprise flowing the crude oil in a subterranean flow path from the reservoir to the surface while the citrate polyester additive is applied to the crude oil.

In an embodiment, the method may further comprise receiving the crude oil at a facility and applying the citrate polyester additive to the crude oil, wherein the facility may be a surface and/or subsea facility.

In an embodiment, the method may further comprise introducing the citrate polyester additive into a wellbore comprising the crude oil to apply the citrate polyester additive to the crude oil.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The present disclosure is, generally, directed to one or more PI additives and/or one or more PPD additives (collectively referred to hereinafter as "the present additive") for crude oils. The present additive is added to, applied to, and/or mixed with crude oils to provide, produce, and/or form one or more crude oil mixtures. After introduction or application to the crude oils, the present additive affects, reduces, or prevents wax crystal formation in the crude oils. The present additive may be added, applied, and/or introduced to the crude oils during production to slow, reduce, or prevent a rate of wax deposition in the crude oils. Additionally, the present additive may be added, applied, and/or introduced to the crude oils during production so that the crude oils are flowable or have improved flowability at anticipated surface conditions. Alternatively, the present additive may be added, applied, and/or introduced to the crude oils at or during other operations besides production. Moreover, the present additive may have a molecular structure that co-crystallizes and/or adsorbs to wax during crystallization and alters the crystal morphology so the crystals fail to adhere to surfaces and/or weaker gel networks are formed.

In embodiments, the present additive may be or may comprise at least one citrate polyester additive that may be derived from, for example, citric acid, one or more alcohols having one or more different chain lengths, and at least one crosslinking reagent. The citrate polyester additive may be a liquid citrate polyester additive or a solid citrate polyester additive. Thus, the present additive may be in either liquid form or solid form. The citrate polyester additive may be a naturally derived citrate polyester, wherein the citric acid may be a fermentation process product, the one or more alcohols may be natural alcohols derived from, for example, coconut, and/or the at least one crosslinking reagent may be derived from, for example, corn.

The one or more different chain lengths of the one or more alcohols have total chain lengths ranging from about C8 to about C30, from about C15 to about C25, or from about C18 to about C22. The one or more different chain lengths may comprise at least one of stearyl C18, octyldodecyl C20, behenyl C22, and a mixture thereof. In some embodiments, the one or more alcohols may comprise at least one of C18 stearyl alcohol, C20 octyldodecanol, C22 behenyl alcohol, and a mixture thereof. In an embodiment, the one or more alcohols may comprise at least one of a solid C18 stearyl alcohol and a liquid C20 octyldodecanol comprising at least one branched molecule.

In embodiments, the present additive is at least one citrate polyester additive comprising at least one citrate crosspolymer. The at least one citrate crosspolymer may be made from starting materials, such as, for example, citric acid, a diol, and fatty alcohols and/or the starting materials may be natural and/or renewable starting materials. In some embodiments, the diol may be, for example, 1,3 propanediol and the fatty alcohol may be a long chain fatty alcohol. The at least one citrate crosspolymer may be according to the general structure

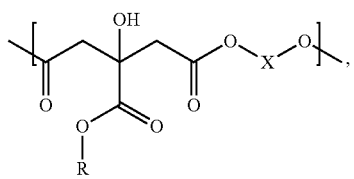

wherein R may be an alkyl group (C1-C50) and/or a proton, and/or X may be a methylene chain. In some embodiment, R may be any number of linear or branched alky groups, or a combination of linear or branched alky groups adapted to a specific crude oil. In at least one embodiment, X may represent a methylene chain terminated with alcohols, such as, for example, branched diols or polyols, ethylene glycol and/or 1,3-propanediol.

In some embodiments, the at least one citrate crosspolymer may comprise one or more citrate crosspolymers selected from the group consisting of octyldodecyl citrate crosspolymer, stearyl/octyldodecyl citrate crosspolymer, behenyl/octyldodecyl propanediol citrate crosspolymer, and a mixture thereof. In an embodiment, the octyldodecyl citrate crosspolymer is CosmoSurf® CE-100, the stearyl/octyldodecyl citrate crosspolymer is CosmoSurf® CE-140, and the behenyl/octyldodecyl propanediol citrate crosspolymer is CosmoSurf® CE-250, all of which are commercially available from Ultra Chemical (Red Bank, N.J.) which is a distributor for SurfaTech Corporation (Lawrenceville, Ga.).

In some embodiments, the present additive may be a blended additive comprising the at least one citrate polyester additive, the at least one citrate crosspolymer, and/or the one or more citrate crosspolymers blended with other PIs and/or other PPDs. For example, the present additive may be at least one blended additive comprising the one or more citrate crosspolymers formulated with at least one selected from poly(ethylene-co-vinyl acetate) (hereinafter "EVA"), one or more graft polymers of EVA, functionalized poly(olefin-co-maleic anhydride), poly(alkylacrylate), functionalized poly(styrene-co-maleic anhydride), poly(alkylmethacrylates), one or more alkyl fumarate copolymers, one or more methacrylic/acrylic copolymers, one or more vinyl acetate olefin copolymers, one or more alkyl phenol resin copolymers, one or more hyperbranched or dendrimeric copolymers, and a mixture thereof. Maleic anhydride in the polymers, when present, may be further derivatized by at least one reaction with alcohol(s) to form esters or alkylamines to form maleimide. Moreover, the one or more citrate crosspolymers of the present additive may be formulated with one or more wax dispersants selected from for example, dodecylbenzenesulfonic acid salts or ethoxylated alcohols, or a mixture thereof.

In embodiments, the present additive may be in the form of a solution, such as, for example, a citrate crosspolymer solution. The citrate crosspolymer solution may comprise at least one citrate polyester additive, the at least one citrate crosspolymer, and/or the one or more citrate crosspolymers dissolved or suspended in at least one solvent of the citrate crosspolymer solution. The at least one solvent of the citrate crosspolymer solution may be at least one selected from, for example, at least one organic solvent, at least one hydrocarbon solvent, at least one aromatic solvent, and a mixture thereof. In some embodiments, the at least one organic solvent may be water or an aqueous-based solution, the at least one solvent may be benzene, toluene, xylene, acetone, 2-butanone, cyclohexanone, methanol, ethanol, propanol, isopropanol, butanol, 2-ethyl hexanol, 2-ethyl hexyl acetate, N-methylpyrrolidone, limonene, dipentene or a mixture thereof, and the at least one aromatic solvent may be at least one C9, C10, C11, C12, C13, C14, C15 and/or C16 aromatic fluid and/or may have an aromatic content of about 97%, about 98%, or about 99% or higher. The at least one aromatic solvent may be, for example, naphthalene-depleted, ultra-low naphthalene, or a mixture thereof. In an embodiment, the at least one solvent of the citrate crosspolymer solution is Solvesso® 150 comprising a high solvency C10 aromatic fluid with aromatic content of at least 98 wt %, which is commercially available from ExxonMobil (Irving, Tex.).

In embodiments, the present additive may be added to, mixed with, and/or applied to at least one crude oil, which may also be referred to hereinafter as petroleum or oils, to produce, provide, and/or form one or more crude oil mixtures. The at least one crude oil may comprise unrefined petroleum and/or liquid petroleum comprising naturally occurring hydrocarbons and/or organic compounds. The hydrocarbons may comprise methane, ethane, propane, butane, pentane, other heavy hydrocarbons, and a mixture thereof. The hydrocarbons may be one or more selected from alkanes or paraffins, cycloalkanes or naphthenes, aromatic hydrocarbons, asphaltics, and a mixture thereof. The at least one crude oil may also comprise other organic compounds, such as, for example, nitrogen, oxygen, sulfur, metals, and/or a mixture thereof. The metals may be, for example, iron, nickel, copper, vanadium, and a mixture thereof. In embodiments, the at least one crude oil may comprise carbon, hydrogen, nitrogen, oxygen, sulfur, metals, and a mixture thereof. One or more natural gases may be dissolved within the at least one crude oil. In some embodiment, the at least one crude oil may comprise resins, alkanes or paraffins, cycloalkanes or naphthenes, naphthenic acid, aromatic hydrocarbons, asphaltenes, or a mixture thereof.

Crude oil may be recovered or recoverable by oil drilling in a geological formation beneath the Earth's surface. The crude oil and/or other produced fluids may flow from a reservoir of the geological formation into a wellbore or borehole (hereinafter "the wellbore") drilled, formed, or disposed within the geological formation. It should be understood that the present disclosure is not limited to specific embodiments with respect to drilling techniques and/or drilling operations for drilling, forming, or disposing the wellbore within the geological formation. The wellbore may be drilled into or formed within the geological formation by one or more drilling techniques and/or drilling operations as known to one of ordinary skill in the art.

In some embodiments, the present additive may be added to, mixed with, and/or applied to at least one wellbore fluid. The wellbore fluid may comprise water and/or brines containing various electrolytes and their blends. In some embodiments, the wellbore fluid may further comprise at least one selected from NaCl, KCl, CaCl2, NaBr, CaBr2, ZnBr2, and a combination thereof. In other embodiments, the wellbore fluid may be a non-aqueous fluid, an oil-based fluid, a synthetic-based fluid, or a mixture thereof. In some embodiments, the wellbore fluid may comprise at least one additive material that may affect or change one or more characteristics and/or properties of the wellbore fluid, wellbore, the crude oil, or a combination thereof. In an embodiment, the at least one additive material of the wellbore fluid may perform one or more wellbore functions within the wellbore. For example, the at least one additive material may be a weighting agent, viscosifier, lubricant and/or the like. It should be understood that the present disclosure is not limited to specific embodiments wellbore fluid and/or the at least one additive material of the wellbore fluid. The wellbore fluid and/or the additive material may be any wellbore fluid and/or any additive material as known to one of ordinary skill in the art.

In embodiments, the present methods disclosed herein may treat the at least one crude oil with the present additive to improve, change, or modify one more characteristics and/or properties of the crude oil. For example, the present additive may be injected into or emplaced within the wellbore to prevent, reduce, or minimize paraffin deposition therein and/or may be introduced into the at least one crude oil. In an embodiment, the present additive may be added to crude oil before the crude oil cools to its cloud point. In another embodiment, the present additive may function as a paraffin dispersant when added to crude oil after the crude oil has cooled below its cold point. Additionally, the present additive may be added to, applied to, and/or mixed with at least one crude oil as a pour point depressant. As a result of the application of the present additive to the crude oil, the pour point temperature of the crude oil may decrease or be depressed from a first temperature to a second temperature.

In some embodiments, the present methods disclosed herein may comprise adding, applying, and/or introducing the present additive to crude oil. The present additive may be directly added or applied to crude oil or may be in the form of the citrate crosspolymer solution that is added or applied to the crude oil. The present additive and/or citrate crosspolymer solution may be added to, applied to, or mixed with the crude oil to produce, provide, or form the crude oil mixture wherein the present additive and/or citrate crosspolymer solution is present at a concentration with respect to the overall crude oil mixture. The concentration of the present additive and/or citrate crosspolymer solution in the crude oil mixture may be from about 50 ppm to about 10,000 ppm, from about 250 ppm to about 7,500 ppm, from about 500 ppm to about 5,000 ppm, from about 750 ppm to about 3,500 ppm, or from about 1,000 ppm to about 2,000 ppm. In an embodiment, the concentration of the present additive and/or citrate crosspolymer solution may be an effective amount that decreases wax or paraffin deposition within the crude oil mixture, decreases or depresses the pour point temperature of the crude oil to the second temperature, and/or reduces or lowers the viscosity of the crude oil for improving the flow characteristics of the crude oil.

In some embodiments, the present method disclosed herein may comprise flowing the crude oil in a subterranean flow path from the reservoir to the surface and/or dissolving and/or suspending the one or more citrate crosspolymers in a solvent to produce, provide, or form the present additive or the citrate crosspolymer solution of the present additive. Further, the present method may comprise adding or applying the present additive to the crude oil or to the subterranean flow path comprising the crude oil for producing, providing, or forming the crude oil mixture. Still further, the present method may comprise receiving the crude oil at a facility or providing the crude oil to the facility and applying the present additive to the crude oil, wherein the facility may be a surface and/or subsea surface. Moreover, the present method may comprise adding the present additive to a wellbore fluid and/or introducing the wellbore fluid comprising the present additive into a wellbore formed in a geological formation. Alternatively, the present method may comprise emplacing the present additive and/or the citric crosspolymer solution into the wellbore during at least one well operation, wherein the wellbore comprises the crude oil.

EXAMPLES

Three citrate crosspolymers commercially available from Ultra Chemical and having side chain compositions and physical forms are set forth in Table 1.

TABLE 1

Citric crosspolymer properties.

| Trade name | Side chains | Physical form |
| --- | --- | --- |
| CosmoSurf ® CE-100 | Octyldodecyl | clear liquid |
| CosmoSurf ® CE-140 | octyldodecyl and stearyl | white solid |
| CosmoSurf ® CE-250 | octyldodecyl and behenyl | white solid |

Example 1: To apply the above-identified three citrate crosspolymer polymers to crude oils and to aid dispersion, all citrate crosspolymers were dissolved in xylene at a concentration of 50 percent by weight. Two crude oils (i.e., crude oils A and B) were treated with the citrate crosspolymer solutions and the pour point was analyzed using adaptations of the ASTM D5853 method. The crude oil A was examined with the ASTM D5853 minimum pour point method as follows:

1. Crude oil A samples were heated to 45° C. for 30 minutes in a water bath.
2. Each sample was dosed with 2000 ppm of formulated pour point depressant, shaken, then returned to 45° C. water bath for 30 minutes.
3. The samples were removed, transferred to pour point tubes, and capped with a stopper equipped with a centralized thermometer.
4. Starting at 36° C. as the samples cooled, and every 3° C. after that, the samples were gently tilted. If crude oil interface was immobile after 5 seconds with the tube held parallel to the ground, the sample was considered to be below its pour point. The last observation in which the interface moved (i.e., 3 degrees above the observation with the immobile interface) is pour point.
5. To maintain a constant cooling rate, the samples were transferred between a series of cooling baths as required:
   a. If the internal temperature of the crude oil sample reached 30° C., the tube was moved to a 0° C. bath;
   b. If the internal temperature of the crude oil sample reached 9° C., the tube was moved to a −18° C. bath;
   c. If the internal temperature of the crude oil sample reached −9° C., the tube was moved to a −33° C. bath;
   d. If the internal temperature of the crude oil sample reached −24° C., the tube was moved to a −51° C. bath; and
   e. If the crude oil sample reaches −36° C., and the oil is still mobile, the experiment ends.

Crude oil B was treated slightly differently than crude oil A. It was first heated to 80° C., dosed with a citrate crosspolymer solution at 2000 ppm, then allowed to cool to room temperature (~20° C.) over one hour. The samples of crude oil B were then reheated to 45° C. and the experiment started at step 3 above.

The results of the pour point experiments are contained in Table 2. The blank pour points for crude oils A and B were 33° C. and 36° C., respectively. CosmoSurf® CE-100 was able to achieve a 3° C. decrease in pour point for both oils. CE-140 only affected crude oil B, decreasing the pour point by 3° C. as well. CE-250 had no effect on either crude oil A or crude oil B.

TABLE 2

Effect of citrate crosspolymers on pour point.

| Pour point depressant | Pour point, crude oil A (° C.) | Pour point, crude oil B (° C.) |
|---|---|---|
| Blank | 33 | 36 |
| CE-100 | 30 | 33 |
| CE-140 | 33 | 33 |
| CE-250 | 33 | 36 |

Example 2: To apply the above-identified three citrate crosspolymer products to crude oils and to aid dispersion, the citrate crosspolymers were dissolved or suspended in naphthalene-depleted Solvesso® 150 at an active concentration of 20% by weight.

Paraffin deposition is evaluated in a lab setting with the cold finger experiment. In this procedure, the crude oil is held at or above its wax appearance temperature (hereinafter "WAT") in a heating bath. A metal cylinder is suspended in the heated oil and then itself cooled to a temperature that is intended to replicate operating conditions. The crude oil can be stirred at different rates to mimic the shear of crude oil passing through the well's tubulars. At the end of the experiment, the cold finger is removed from the crude oil and the wax deposit is weighed. The efficacy of a paraffin inhibitor is measured as the percentage difference between the treated and uninhibited blank sample:

Inhibition (%)=100*(Mb−Mt)/Mb

Mb=mass of the wax deposit from an uninhibited crude oil blank
Mt=mass of the wax deposit from a crude oil treated with a paraffin inhibitor The above-identified three citrate crosspolymer products were tested against two crude oils. A sample from Louisiana had a WAT of 17° C. The cold finger experiment was conducted at an oil temperature of 30° C., a finger temperature of 2° C., and a stir bar speed of 300 RPM. The experiment duration was 18 hours. The experiments were conducted in two sets, with three blanks and three treated samples. The citrate crosspolymer solutions were added to the treated samples at a concentration of 1000 ppm.

To calculate the inhibition of a certain citrate crosspolymer, the blank runs were averaged (experiments 3.1, 3.2, and 3.3; average=0.79 g). The three citrate crosspolymer additives exhibit paraffin inhibition as shown in Table 3.

TABLE 3

Cold finger experiments with Louisiana crude oil.

| Exp. # | Inhibitor | Wax Deposit (g) | Inhibition |
|---|---|---|---|
| 1 | Blank | 0.83 | |
| 2 | Blank | 0.80 | |
| 3 | Blank | 0.73 | |
| 4 | CosmoSurf ® CE-100 | 0.66 | 16% |
| 5 | CosmoSurf ® CE-140 | 0.70 | 11% |
| 6 | CosmoSurf ® CE-250 | 0.72 | 8% |

The second oil tested with the citrate crosspolymers was from offshore Brazil. It has a WAT of 50.6° C. and a wax disappearance temperature of 59.1° C. The crude oil was heated to 46.1° C. for these cold finger experiments. The cold fingers were maintained at 36.1° C. The stir bar was spun at 350 RPM. Again, all inhibitors were dosed at 1000 ppm. Due to known variability at high deposition temperatures, six blank samples were used, each from a different finger on the apparatus. The average blank deposition was 79.0 mg. All blank samples were performed on one day, while the treated samples were analyzed on another.

The inhibition of the treated samples was compared to the average of all blanks and compared to the finger on which it was run (see Table 4). The deposit for CE-100 is the greatest of all measurements, meaning the additive increases deposition. CE-140 and CE-250 both decrease the wax deposit on the cold finger. The inhibition provided by CE-250, ~75%, is practical for field applications.

TABLE 4

Cold finger experiments with crude oil from offshore Brazil.

| Exp. # | Cold Finger | Inhibitor | Wax Deposit (mg) | Inhibition by finger | Inhibition by average |
|---|---|---|---|---|---|
| 1 | 1 | Blank | 67.4 | | |
| 2 | 2 | Blank | 80.8 | | |
| 3 | 3 | Blank | 103 | | |
| 4 | 4 | Blank | 74.2 | | |
| 5 | 5 | Blank | 72.3 | | |
| 6 | 6 | Blank | 76.4 | | |
| 7 | 1 | CosmoSurf CE-100 | 119.3 | −77% | −51% |
| 8 | 4 | CosmoSurf CE-140 | 37.1 | 50% | 53% |
| 9 | 5 | CosmoSurf CE-250 | 18.8 | 74% | 76% |

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A crude oil mixture comprising:
   crude oil; and
   at least one citrate polyester additive comprising one or more citrate crosspolymers.

2. The crude oil of claim 1, wherein the one or more citrate crosspolymers is according to the general structure

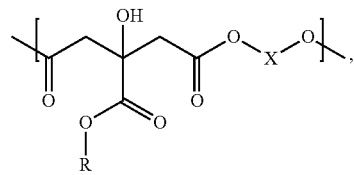

wherein R is an alkyl group, X is methylene chain, and a ratio of R:X is about 1:1 or greater or less than about 1:1.

3. The crude oil mixture of claim 1, wherein the at least one citrate polyester additive is a citrate crosspolymer solution comprising one or more citrate crosspolymers dissolved or suspended in a solvent of the citrate crosspolymer solution.

4. The crude oil mixture of claim 3, the citrate crosspolymer solution is present in the crude oil mixture at a concentration ranging from about 100 ppm to about 10,000 ppm.

5. The crude oil mixture of claim 3, wherein the solvent is at least one aromatic solvent having an aromatic content of about 98% or higher.

6. The crude oil mixture of claim 1, wherein the one or more citrate crosspolymers comprises at least one side chain selection from at least one octyldodecyl side chain, at least one stearyl side chain, at least one behenyl side chain, and a mixture thereof.

7. The crude oil mixture of claim 1, wherein the one or more citrate crosspolymers is selected from an octyldodecyl citrate crosspolymer, a stearyl/octyldodecyl citrate crosspolymer, a behenyl/octyldodecyl propanediol citrate crosspolymer, and a mixture thereof.

8. The crude oil mixture of claim 1, wherein the at least one citrate polyester additive further comprises at least one selected from poly(ethylene-co-vinyl acetate), one or more graft polymers of poly(ethylene-co-vinyl acetate), functionalized poly(olefin-co-maleic anhydride), poly(alkylacrylate), functionalized poly(styrene-co-maleic anhydride), poly(alkylmethacrylates), one or more alkyl fumarate copolymers, one or more methacrylic/acrylic copolymers, one or more vinyl acetate olefin copolymers, one or more alkyl phenol resin copolymers, one or more hyperbranched or dendrimeric copolymers, and a mixture thereof.

9. A crude oil mixture comprising:
crude oil; and
a citrate crosspolymer solution comprising one or more citrate crosspolymers dissolved or suspended within a solvent of the citrate crosspolymer solution.

10. The crude oil mixture of claim 9, wherein the one or more citrate crosspolymers is according to the general structure

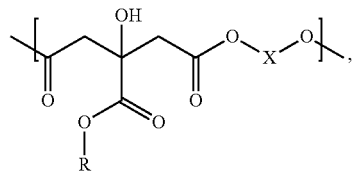

wherein R is an alkyl group, X is methylene chain, and a ratio of R:X is about 1:1 or greater or less than 1:1.

11. The crude oil mixture of claim 9, wherein the citrate crosspolymer solution is present in the crude oil mixture at a concentration ranging from about 750 ppm to about 3,500 ppm.

12. The crude oil mixture of claim 11, wherein the concentration ranges from about 1,000 ppm to about 2,000 ppm.

13. The crude oil mixture of claim 9, wherein the one or more citrate crosspolymers comprises at least one side chain selection from an octyldodecyl side chain, a stearyl side chain, a behenyl side chain, and a mixture thereof.

14. The crude oil mixture of claim 9, wherein the one or more citrate crosspolymers is selected from an octyldodecyl citrate crosspolymer, a stearyl/octyldodecyl citrate crosspolymer, a behenyl/octyldodecyl propanediol citrate crosspolymer, and a mixture thereof.

15. A method comprising:
applying a citrate polyester additive to a crude oil, wherein the citrate polyester additive comprises one or more citrate crosspolymers.

16. The method of claim 15, wherein the one or more citrate crosspolymers is according to the general structure

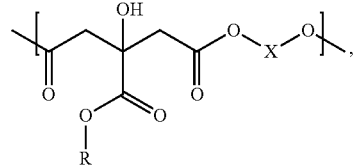

wherein R is an alkyl group, X is methylene chain, and a ratio of R:X is about 1:1 or greater or less than 1:1.

17. The method of claim 15, wherein the one or more citrate crosspolymers is dissolved or suspended in a solvent to produce the citrate polyester additive.

18. The method of claim 15, further comprising:
flowing the crude oil in a subterranean flow path from a reservoir to a surface while the citrate polyester additive is applied to the crude oil.

19. The method of claim 15, further comprising:
receiving the crude oil at a facility or providing the crude oil to the facility; and
applying the citrate polyester additive to the crude oil, wherein the facility is selected from the group consisting of a surface facility, a subsea facility, and a combination thereof.

20. The method of claim 15, further comprising:
introducing the citrate polyester additive into a wellbore comprising the crude oil to apply the citrate polyester additive to the crude oil.

* * * * *